(12) United States Patent
Liu et al.

(10) Patent No.: US 11,889,342 B2
(45) Date of Patent: Jan. 30, 2024

(54) METHOD AND APPARATUS FOR QUALITY OF SERVICE MANAGEMENT

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 17/290,514

(22) PCT Filed: Oct. 30, 2019

(86) PCT No.: PCT/CN2019/114359
§ 371 (c)(1),
(2) Date: Apr. 30, 2021

(87) PCT Pub. No.: WO2020/088529
PCT Pub. Date: May 7, 2020

(65) Prior Publication Data
US 2022/0007235 A1    Jan. 6, 2022

(30) Foreign Application Priority Data
Oct. 30, 2018    (WO) ................ PCT/CN2018/112585

(51) Int. Cl.
*H04L 43/06*        (2022.01)
*H04L 43/0852*    (2022.01)
(Continued)

(52) U.S. Cl.
CPC ......... *H04W 28/0236* (2013.01); *H04L 43/06* (2013.01); *H04L 43/0852* (2013.01);
(Continued)

(58) Field of Classification Search
CPC ....... H04L 43/02–55; H04L 45/02–851; H04L 47/10–83; H04B 7/02–216;
(Continued)

(56) References Cited

U.S. PATENT DOCUMENTS

2003/0204619 A1    10/2003    Bays
2010/0110909 A1    5/2010    Slutsman et al.
(Continued)

OTHER PUBLICATIONS

Lenovo, et al., "R2-1805207: IAB node selection for backhaul setup in multi-hop case," 3GPP TSG-RAN WG2 Meeting#101bis, Apr. 16-20, 2018, Sanya, China, 3 pages.
(Continued)

*Primary Examiner* — Timothy J Weidner
(74) *Attorney, Agent, or Firm* — Withrow & Terranova, PLLC

(57) ABSTRACT

Embodiments of the present disclosure provide methods and apparatuses for quality of service management. A method implemented at a first device may comprise determining one or more sub latency targets corresponding to one or more intermediate devices along an uplink or downlink route between a second device and a third device based on an uplink or downlink route total latency target and an uplink or downlink latency of one hop along the uplink or downlink route of each of the one or more intermediate devices; and sending the one or more sub latency targets to the one or more intermediate devices, wherein a sum of the one or more sub latency targets is smaller than or equal to the uplink or downlink total latency target.

19 Claims, 15 Drawing Sheets

(51) Int. Cl.

| | |
|---|---|
| *H04L 43/091* | (2022.01) |
| *H04L 43/16* | (2022.01) |
| *H04W 24/08* | (2009.01) |
| *H04W 24/10* | (2009.01) |
| *H04W 28/02* | (2009.01) |
| *H04W 28/08* | (2023.01) |
| *H04W 28/086* | (2023.01) |
| *H04W 28/24* | (2009.01) |
| *H04W 40/22* | (2009.01) |
| *H04W 40/24* | (2009.01) |
| *H04W 76/15* | (2018.01) |
| *H04W 76/25* | (2018.01) |
| *H04W 84/02* | (2009.01) |
| *H04W 88/02* | (2009.01) |
| *H04W 88/08* | (2009.01) |
| *H04W 88/12* | (2009.01) |
| *H04W 88/18* | (2009.01) |
| *H04W 92/02* | (2009.01) |
| *H04W 92/10* | (2009.01) |
| *H04W 92/12* | (2009.01) |
| *H04W 92/20* | (2009.01) |

(52) U.S. Cl.
CPC ............ *H04L 43/091* (2022.05); *H04L 43/16* (2013.01); *H04W 24/08* (2013.01); *H04W 24/10* (2013.01); *H04W 28/0252* (2013.01); *H04W 28/0284* (2013.01); *H04W 28/0862* (2023.05); *H04W 28/0967* (2020.05); *H04W 28/24* (2013.01); *H04W 40/22* (2013.01); *H04W 40/24* (2013.01); *H04W 76/15* (2018.02); *H04W 76/25* (2018.02); *H04W 84/02* (2013.01); *H04W 88/02* (2013.01); *H04W 88/08* (2013.01); *H04W 88/12* (2013.01); *H04W 88/18* (2013.01); *H04W 92/02* (2013.01); *H04W 92/10* (2013.01); *H04W 92/12* (2013.01); *H04W 92/20* (2013.01)

(58) Field of Classification Search
CPC ............ H04B 17/0082–409; H04W 8/22–245; H04W 24/02–10; H04W 28/02–26; H04W 36/0005–385; H04W 40/005–38; H04W 48/02–20; H04W 72/02–569; H04W 74/002–0891; H04W 76/10–50; H04W 84/005–22; H04W 88/005–188; H04W 92/02–24
See application file for complete search history.

(56) References Cited

U.S. PATENT DOCUMENTS

| | | |
|---|---|---|
| 2012/0147779 A1 | 6/2012 | Burckart et al. |
| 2013/0028127 A1* | 1/2013 | Zheng ............... H04W 28/0236 |
| 2018/0020324 A1 | 1/2018 | Beauford |
| 2018/0219757 A1 | 8/2018 | Wanser et al. |
| 2020/0037196 A1* | 1/2020 | Iwai .................. H04W 28/0268 |
| 2021/0219368 A1* | 7/2021 | Fujishiro ........... H04W 36/0055 |

OTHER PUBLICATIONS

Nokia, et al., "R1-1804622: Dynamic resource allocation between backhaul and access links," 3GPP TSG RAN WG1 #92bis, Apr. 16-20, 2018, Sanya, China, 7 pages.

ZTE, "R2-1814722: Latency analysis for IAB network," 3GPP TSG-RAN WG2#103bis, Oct. 8-12, 2018, Chengdu, China, 5 pages.

ZTE, "R3-185535: Comparison of IAB architecture group 1 and architecture group 2," 3GPP TSG-RAN WG3 Meeting #101bis, Oct. 8-12, 2018, Chengdu, China, 6 pages.

Extended European Search Report for European Patent Application No. 19877678.3, dated Jun. 21, 2022, 8 pages.

International Search Report and Written Opinion for International Patent Application No. PCT/CN2019/114359, dated Jan. 16, 2020, 10 pages.

* cited by examiner

300 ⟶

302

Determining one or more sub latency targets corresponding to one or more intermediate devices along an uplink or downlink route between a second device and a third device based on an uplink or downlink route total latency target and an uplink or downlink latency of one hop along the uplink or downlink route of each of the one or more intermediate devices

304

Sending the one or more sub latency targets to the one or more intermediate devices, wherein a sum of the one or more sub latency targets is smaller than or equal to the uplink or downlink total latency target

Determining the uplink or downlink total latency target according to Quality of Service (QoS) requirement

404

Determining one or more sub latency targets corresponding to one or more intermediate devices along an uplink or downlink route between a second device and a third device based on an uplink or downlink route total latency target and an uplink or downlink latency of one hop along the uplink or downlink route of each of the one or more intermediate devices

406

Sending the one or more sub latency targets to the one or more intermediate devices, wherein a sum of the one or more sub latency targets is smaller than or equal to the uplink or downlink total latency target

502 Obtaining a report related to the uplink or downlink latency

504 Computing the uplink or downlink latency based on the report

506 Determining one or more sub latency targets corresponding to one or more intermediate devices along an uplink or downlink route between a second device and a third device based on an uplink or downlink route total latency target and an uplink or downlink latency of one hop along the uplink or downlink route of each of the one or more intermediate devices

508 Sending the one or more sub latency targets to the one or more intermediate devices, wherein a sum of the one or more sub latency targets is smaller than or equal to the uplink or downlink total latency target

Sending a report related to the uplink or downlink latency of the intermediate device to the first device

704

Receiving a sub latency target for an uplink or downlink latency of one hop of the intermediate device from a first device

706

Performing data processing with resources scheduled according to the sub latency target, wherein the intermediate device is located in an uplink or downlink route between a second device and a third device

FIG. 7

METHOD AND APPARATUS FOR QUALITY OF SERVICE MANAGEMENT

This application is a 35 U.S.C. § 371 national phase filing of International Application No. PCT/CN2019/114359, filed Oct. 30, 2019, which claims the benefit of International Application No. PCT/CN2018/112585, filed Oct. 30, 2018, the disclosures of which are incorporated herein by reference in their entireties.

TECHNICAL FIELD

The non-limiting and exemplary embodiments of the present disclosure generally relate to the technical field of communications, and specifically to methods and apparatuses for quality of service (QoS) management.

BACKGROUND

This section introduces aspects that may facilitate a better understanding of the disclosure. Accordingly, the statements of this section are to be read in this light and are not to be understood as admissions about what is in the prior art or what is not in the prior art.

In 3rd Generation Partnership Project (3GPP) Release 16, the Integrated Access and Backhaul (IAB) Study Item (SI) has been approved. For a new radio (NR) system with IAB capability, an access point can setup a radio connection to another access point in order to reach a donor access point which has wireline backhaul, wherein an access point is also referred to as IAB node. FIG. 1 schematically shows a network with IAB capability. As shown in FIG. 1, the radio connection between IAB node (IAB-N) (such as Next Generation Node Bases (gNBs) (i.e., the base stations in NR terminology) may be referred to as wireless backhaul. The donor IAB-N such as IAB-N x has a cable backhaul to a gateway such as NGC (Next Generation Core), IAB-N y acts as a bridge node between the IAB-N x and IAB-N z, where IAB-N y may be referred to as the parent IAB-N of IAB-N z and IAB-N z may be referred to as the child IAB-N of IAB-N y. In another branch, IAB-N k is connected to IAB-N j, and IAB-N j is connected to IAB-N x. Each IAB-N may also have one or more user equipments (UEs) connected to it.

For an IAB, there may be three types of links: an upstream link to/from a parent IAB-N; a downstream link to/from a child IAB-N; and a number of downlink/uplink access links to the served UEs. The first two types of links may be referred to as backhaul links. For a data packet transmission from the donor IAB to a UE served by a child IAB-N or from a UE served by the child IAB to the donor IAB, the data packet may experience radio transmissions in multiple hops. A total transmission delay of the data packet is a sum of the transmission delays in the access link and all the backhaul links. For a service with certain QoS requirement (such as latency and packet loss requirement), the link between the UE and the donor IAB-N is required to meet the QoS requirement.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a first aspect of the disclosure, there is provided a method implemented at a first device. The method may comprise determining one or more sub latency targets corresponding to one or more intermediate devices along an uplink or downlink route between a second device and a third device based on an uplink or downlink route total latency target and an uplink or downlink latency of one hop along the uplink or downlink route of each of the one or more intermediate devices. The method may comprise sending the one or more sub latency targets to the one or more intermediate devices. A sum of the one or more sub latency targets is smaller than or equal to the uplink or downlink total latency target.

In a second aspect of the disclosure, there is provided a method implemented at an intermediate device. The method may comprise receiving a sub latency target for an uplink or downlink latency of one hop of the intermediate device from a first device. The method may comprise performing data processing with resources scheduled according to the sub latency target. The intermediate device is located in an uplink or downlink route between a second device and a third device.

In a third aspect of the disclosure, there is provided an apparatus implemented at a first device. The apparatus may comprise a processor; and a memory coupled to the processor. Said memory containing instructions executable by said processor, whereby said apparatus is operative to determine one or more sub latency targets corresponding to one or more intermediate devices along an uplink or downlink route between a second device and a third device based on a uplink or downlink route total latency target and an uplink or downlink latency of one hop along the uplink or downlink route of each of the one or more intermediate device. Said apparatus is operative to send the one or more sub latency targets to the one or more intermediate devices. A sum of the one or more sub latency targets is smaller than or equal to the uplink or downlink total latency target.

In a fourth aspect of the disclosure, there is provided an apparatus implemented at an intermediate device. The apparatus may comprise a processor; and a memory coupled to the processor. Said memory containing instructions executable by said processor, whereby said apparatus is operative to receive a sub latency target for an uplink or downlink latency of one hop of the intermediate device from a first device. Said apparatus is operative to perform data processing with resources scheduled according to the sub latency target. The intermediate device is located in an uplink or downlink route between a second device and a third device.

In a fifth aspect of the disclosure, there is provided a computer program product, comprising instructions which, when executed on at least one processor, cause the at least one processor to carry out the method according to the first aspect of the disclosure.

In a sixth aspect of the disclosure, there is provided a computer program product, comprising instructions which, when executed on at least one processor, cause the at least one processor to carry out the method according to the second aspect of the disclosure.

In a seventh aspect of the disclosure, there is provided a computer-readable storage medium storing instructions which when executed by at least one processor, cause the at least one processor to carry out the method according to the first aspect of the disclosure.

In an eighth aspect of the disclosure, there is provided a computer-readable storage medium storing instructions which when executed by at least one processor, cause the at least one processor to carry out the method according to the second aspect of the disclosure.

In a ninth aspect of the disclosure, there is provided an apparatus implemented at a first device. The apparatus may comprise a first determining unit configured to determine one or more sub latency targets corresponding to one or more intermediate devices along an uplink or downlink route between a second device and a third device based on an uplink or downlink route total latency target and an uplink or downlink latency of one hop along the uplink or downlink route of each of the one or more intermediate devices. The apparatus may further comprise a sending unit configured to send the one or more sub latency targets to the one or more intermediate devices. A sum of the one or more sub latency targets is smaller than or equal to the uplink or downlink total latency target.

In a tenth aspect of the disclosure, there is provided an apparatus implemented at an intermediate device. The apparatus may comprise a receiving unit configured to receive a sub latency target for an uplink or downlink latency of one hop of the intermediate device from a first device. The apparatus may further comprise a performing unit configured to perform data processing with resources scheduled according to the sub latency target, wherein the intermediate device is located in an uplink or downlink route between a second device and a third device.

Embodiments herein afford many advantages, of which a non-exhaustive list of examples follows. Some embodiments herein may improve the delay performance of self-backhauling. Some embodiments herein may improve the delay requirement of service. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3 shows a flowchart of a method according to an embodiment of the present disclosure;

FIG. 4 shows a flowchart of a method according to another embodiment of the present disclosure;

FIG. 5 shows a flowchart of a method according to another embodiment of the present disclosure;

FIG. 7 shows a flowchart of a method according to another embodiment of the present disclosure;

DETAILED DESCRIPTION

Figure 1:
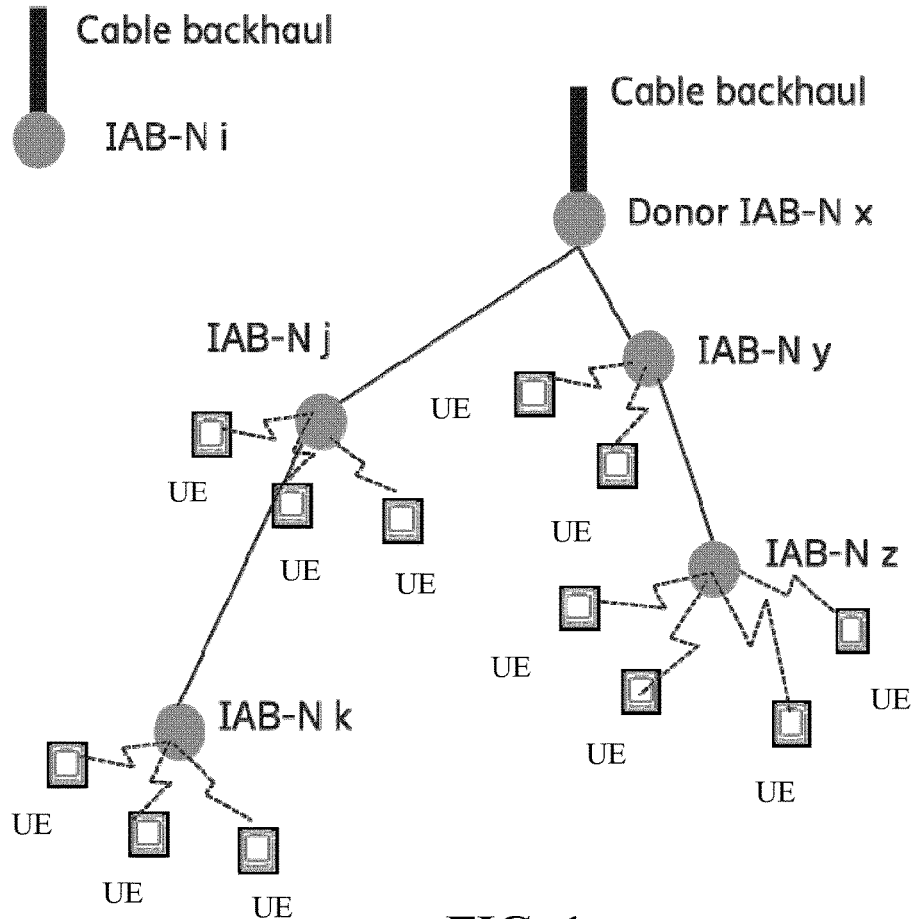
FIG. 1 schematically shows a network with IAB capability.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "network" refers to a network following any suitable wireless/wired communication standards such as new radio (NR), long term evolution (LTE), LTE-Advanced, and so on. In the following description, the terms "network" and "system" can be used interchangeably. Furthermore, the communications between two devices in the network may be performed according to any suitable communication protocols, including, but not limited to, the communication protocols as defined by some of standards organizations such as the 3rd Generation Partnership Project (3GPP), the International Organization for Standardization (ISO), the International Telecommunication Union (ITU), the Institute of Electrical and Electronics Engineers (IEEE), and the Internet Engineering Task Force (IETF), etc. For example, the communication protocols as defined by 3GPP may comprise the fourth generation (4G), 4.5G, the fifth generation (5G) communication protocols, and/or any other protocols either currently known or to be developed in the future.

The term "network device" refers to a network device in a communication network via which a terminal device accesses to the network and receives services therefrom. For example, in a wireless communication network, the network device may refer to a base station (BS), an IAB node, an access point (AP), a multi-cell/multicast coordination entity (MCE), a controller or any other suitable device. The BS may be, for example, a node B (NodeB or NB), IAB node, an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (TOT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
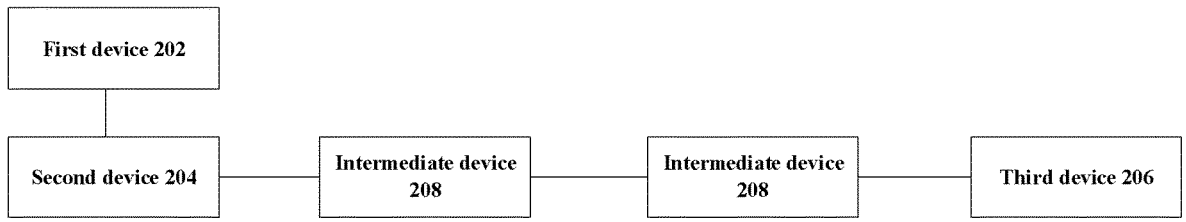
FIG. 2 depicts a schematic system, in which some embodiments of the present disclosure can be implemented.

FIG. 2 depicts a schematic system, in which some embodiments of the present disclosure can be implemented. The system 200 may comprise a first device 202, a second device 204, a third device 206 and one or more intermediate devices 208 along an uplink or downlink route between the second device 204 and the third device 206. The first device 202 may be a delay manager which may be an independent device or included in other device such as the second device 204 or the third device 206 or an operations administration and maintenance (OAM) system. In an embodiment, the second device 204 and the third device 206 may be any two devices in the network which have data transmission requirement. In another embodiment, the second device 204 may be the network device and the third device 206 may be a terminal device. The first device 202 can determine one or more sub latency targets corresponding to one or more intermediate devices along an uplink or downlink route between the second device 204 and the third device 206 based on an uplink or downlink route total latency target and an uplink or downlink latency of one hop along the uplink or downlink route of each of the one or more intermediate devices 208. The intermediate devices 208 may perform data processing with resources scheduled according to their respective sub latency targets. The second device 204, the third device 206 and the one or more intermediate devices 208 may be any suitable devices such as a wireless device, for example a transmission device, a router or a switch. For example, in the IAN network, the second device 204 may be the donor IAB node, the third device 206 may be UE, the intermediate devices 208 may be the IAB nodes and the first device may be an independent device or included in the second device 204 or other suitable device such as OAM. Note that there may be any other suitable devices in the system 200 though only the first device 202, the second device 204, the third device 206 and the one or more intermediate devices 208 are shown in FIG. 2.

In various embodiments, an uplink route may refer to the route for data transmission from the third device 206 such as UE to the second device 204 such as the donor IAB-N and a downlink route may refer to the route for data transmission from the second device 204 such as the donor IAB-N to the third device 206 such as UE. An uplink transmission may refer to the data transmission from a device to its serving device (for example from a UE to its serving IAB node or from an IAB node to its parent IAB node) and a downlink transmission may refer to the opposite direction.

While this and other embodiments below are primarily discussed in the context of the IAB network as shown in FIG. 1, it will be recognized by those of ordinary skill that the disclosure is not so limited. In fact, the various aspects of this disclosure are useful in any network/system that can benefit from the embodiments as is described herein.

An example of IAB network is shown in FIG. 1. As shown in FIG. 1, the IAB network has a tree architecture, with the root being a donor IAB-N, for example, a base station such as gNB with a wired connection to the core network. Note that the IAB network may have any other suitable architecture in addition to the tree architecture in other embodiments. The IAB-N may assign specific time and frequency resources for downlink and/or uplink communication with any connected UE or its child IAB-N. The data transfer from a UE to the donor IAB-N may across multiple intermediate nodes/hops. For a service with certain QoS requirement (such as latency and packet loss requirement), the link between the UE and the donor IAB-N is required to meet the QoS requirement. For example, the delay of uplink/downlink data transmission between a UE and the donor IAB-N may depends on the route length and the transmission delay of each hop. Therefore a mechanism for delay management for the IAB system may be desirable so that the data transmission delay along the route for example between UE and the donor IAB can be managed to meet the QoS requirement.

FIG. 3 shows a flowchart of a method 300 according to an embodiment of the present disclosure, which may be implemented at a first device such as the donor IAB node as shown in FIG. 1 or the first device 202 as shown in FIG. 2. As such, the first device may provide means for accomplishing various parts of the method 300 as well as means for accomplishing other processes in conjunction with other components.

At block 302, the first device may determine one or more sub latency targets corresponding to one or more intermediate devices along an uplink or downlink route between a second device and a third device based on an uplink or downlink route total latency target and an uplink or downlink latency of one hop along the uplink or downlink route of each of the one or more intermediate devices. The one or more intermediate devices, the second device and the third device may be the corresponding intermediate devices 208, second device 204 and third device 206 as shown in FIG. 2.

In an embodiment, the first device may be an independent device or included in the second device or the third device or an operations administration and maintenance (OAM) system. In another embodiment, the first device may be included in or co-located with any other suitable device such as the intermediate device.

In an embodiment, the second device, the third device and the one or more intermediate devices may be wireless devices. In another embodiment, the second device, the third device and the one or more intermediate devices may be wired devices. In still another embodiment, a part of them may be the wired devices and the other part of them may be the wireless devices. In still another embodiment, the second device may be the donor IAB node, the third device may be a UE, and the one or more intermediate devices may be IAB nodes.

The uplink or downlink route total latency target may be predefined or configured or updated. For example, the uplink or downlink route total latency target may be predefined according to the QoS requirement or certain communication standard such as 3GPP specification. The uplink or downlink route total latency target may be configured by the operator or manufacturer or user. When the uplink or downlink route total latency target for a route has changed, the uplink or downlink route total latency target may be updated.

The uplink or downlink latency of one hop along the uplink or downlink route of each of the one or more intermediate devices may be determined in various ways. For example, the first network device may obtain the uplink or downlink latency of one hop from each intermediate device or from the OAM. As another example, the first network device may determine or derive the uplink or downlink latency of one hop by itself for example based on a measurement report of the intermediate device. The uplink or downlink latency of one hop may comprise an achieved/achievable uplink or downlink latency of data transmission between the two network devices of this hop.

When the first device has obtained or determined the uplink or downlink route total latency target and the uplink or downlink latency of one hop along the uplink or downlink route of each of the one or more intermediate devices, the first device may determine one or more sub latency targets corresponding to one or more intermediate devices along an uplink or downlink route between the second device and the third device. The sum of the one or more sub latency targets may be smaller than or equal to the uplink or downlink total latency target.

At block 304, the first device may send the one or more sub latency targets to the one or more intermediate devices. The first device may send the one or more sub latency targets to the one or more intermediate devices in various ways. For example, the first device may send the corresponding sub latency target to each of the one or more intermediate devices. The first device may send the one or more sub latency targets to the first intermediate device along the route which may determine its corresponding sub latency target and forward the remaining sub latency targets to the second intermediate device along the route and so on. The one or more sub latency targets may be sent in any suitable message such as a dedicated message or included in other suitable message. In an embodiment, the one or more sub latency targets may be sent in a media access control control element (MAC CE) or radio resource control (RRC) signaling.

In an embodiment, when the uplink or downlink total latency target and/or the uplink or downlink latency of at least one of the one or more intermediate device have changed, blocks 302 and 304 are re-performed.

FIG. 4 is a flow chart depicting a method 400 according to an embodiment of the present disclosure, which may be implemented at a first device such as the donor IAB node as shown in FIG. 1 or the first device 202 as shown in FIG. 2. As such, the first device may provide means for accomplishing various parts of the method 400 as well as means for accomplishing other processes in conjunction with other components. Blocks 404 and 406 are similar to blocks 302 and 304, detailed description thereof is omitted here for brevity.

At block 402, the first device may determine the uplink or downlink total latency target according to QoS requirement. For example, the QoS requirement may comprise the uplink or downlink total latency requirement, then the first device may determine the uplink or downlink total latency target according to the uplink or downlink total latency requirement.

FIG. 5 is a flow chart depicting a method 500 according to an embodiment of the present disclosure, which may be implemented at a first device such as the donor IAB node as shown in FIG. 1 or the first device 202 as shown in FIG. 2. As such, the first device may provide means for accomplishing various parts of the method 500 as well as means for accomplishing other processes in conjunction with other components. Blocks 506 and 508 are similar to blocks 302 and 304, detailed description thereof is omitted here for brevity.

At block 502, the first device may obtain a report related to the uplink or downlink latency. The report may be obtained in various ways such as in a MAC CE or RRC signaling or from the OAM system. For example, the report of the intermediate device may be provided to its neighboring nodes. The report may be further aggregated across all the intermediate nodes, and eventually sent to the first device or OAM system. In another example, each intermediate device may directly send its report to the first node or OAM system.

The report may comprise any suitable information which can be used to determine or compute the uplink or downlink latency of one hop of each of the one or more intermediate devices. In an embodiment, the report may comprise at least one of latency measurement report, configuration information, capability information and status information of each of the one or more intermediate devices.

In an embodiment, the latency measurement report may comprise at least one of an uplink transmission latency, a downlink transmission latency and a processing latency. The uplink transmission latency, the downlink transmission latency and the processing latency may be measured by using any suitable measurement mechanism either currently known or to be developed in the future.

In an embodiment, the configuration information may comprise at least one of a configuration of supported one or more numerologies, a slot duration and a configuration of time division duplex pattern. In the NR system, multiple numerologies may be used. For example, different numerologies can be configured for different carriers. There can be multiple BandWidth Parts (BWPs) configured in one carrier and one UE can be configured with one or multiple BWPs. Different BWPs may be configured with different numerologies to meet different QoS requirements.

In an embodiment, the capability information may comprise at least one of supportable numerology list, a slot or mini-slot duration list, signaling processing delay for Physical Downlink Shared Channel (PDSCH), signaling processing delay for Physical Uplink Shared Channel (PUSCH) and a list of supportable time division duplex patterns. 5G NR introduces a new "mini-slot". The new mini-slot being introduced in 5G NR may occupy two symbols.

In an embodiment, the status information may comprise traffic load status. In another embodiment, the status information may comprise other load status such as processor load.

In an embodiment, the report may be obtained periodically. For example, each intermediate device may send its report periodically to the first device or the device storing the report such as OAM may send the report periodically to the first device. The periodicity may be set or reconfigured via any suitable message such as a RRC signaling.

In an embodiment, the report may be obtained in response to sending a polling message. For example, the first device may send the polling message to a specific intermediate device or OAM. Upon the reception of the polling message, the specific intermediate device or OAM may generate and transmit its report. When the specific intermediate device is a wireless node such as IAB-N, it may transmit its report for example when there is uplink grant available.

In an embodiment, when at least one of the one or more intermediate device determines that an achieved/achievable uplink or downlink latency of the at least one intermediate device is below a corresponding sub latency target by more than a first offset, meaning that the allocated sub latency targets is overset and can be adjusted, it may send its report to the first device. The first offset may be configured by the operator or manufacturer.

In an embodiment, when at least one of the one or more intermediate device determines that an achieved/achievable uplink or downlink latency of the at least one intermediate device is above the corresponding sub latency target by more than a second offset, meaning that the allocated sub latency targets cannot be fulfilled and can be adjusted, it may send its report to the first device. The second offset may be configured by the operator or manufacturer.

At block 504, the first device may compute the uplink or downlink latency based on the report. For example, the first device may compute the uplink or downlink latency based on any information included in the report.

In an embodiment, the uplink or downlink total latency target, the one or more sub latency targets and the uplink or downlink latency are related to a type of service or a logical channel or a logical channel group or a radio bearer. For example, the uplink/downlink latency related to the type of service or the logical channel or the logical channel group or the radio bearer can be reported. The first device may compute the uplink or downlink latency related to the type of service or the logical channel or the logical channel group or the radio bearer. The first device may determine the uplink or downlink total latency target related to the type of service or the logical channel or the logical channel group or the radio bearer. The at least one of the one or more intermediate device may determine that an achieved/achievable uplink or downlink latency of the at least one intermediate device is below a corresponding sub latency target related to the type of service or the logical channel or the logical channel group or the radio bearer by more than a first offset or is above the corresponding sub latency target by more than a second offset. The first device may determine the one or more sub latency targets related to the type of service or the logical channel or the logical channel group or the radio bearer.

In another embodiment, the uplink or downlink total latency target, the one or more sub latency targets and the uplink or downlink latency may not be related to the type of service or a logical channel or the logical channel group or the radio bearer, meaning that the one or more sub latency targets may be applied for all the services or logical channels or logical channel groups or radio bearers regardless of what service/logical channel/logical channel group is carried on the route.

Figure 6:
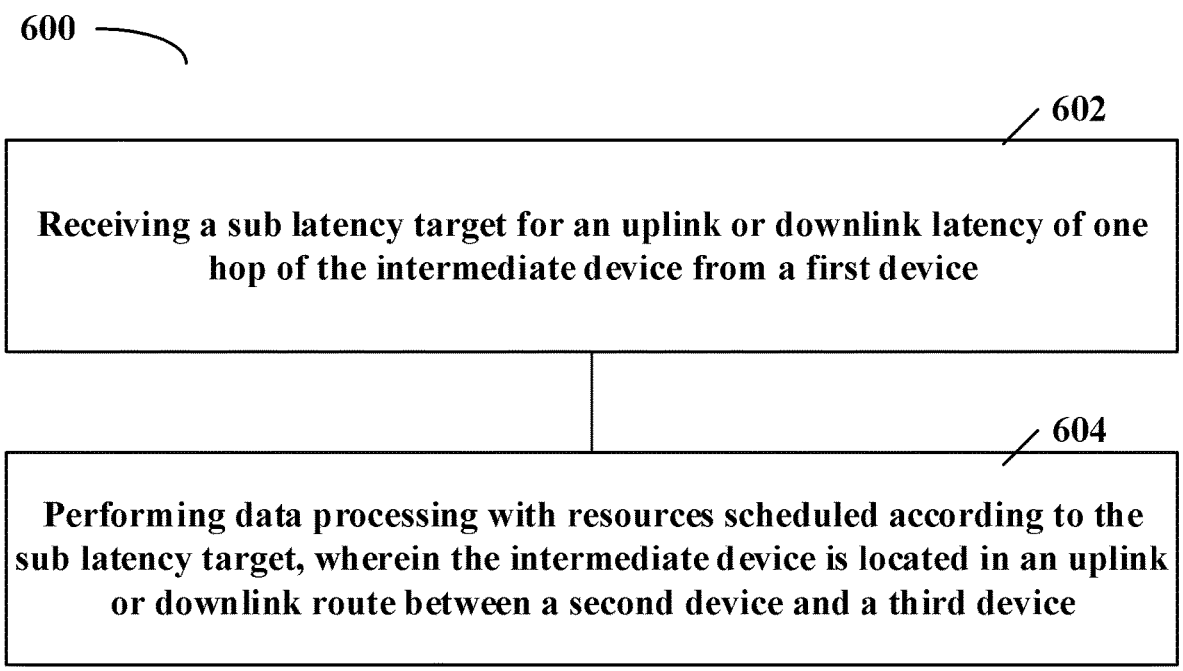
FIG. 6 shows a flowchart of a method according to an embodiment of the present disclosure.

FIG. 6 is a flow chart depicting a method 600 according to an embodiment of the present disclosure, which may be implemented at an intermediate device such as the intermediate device 208 as shown in FIG. 2 or IAB node as shown in FIG. 1. As such, the intermediate device may provide means for accomplishing various parts of the method 600 as well as means for accomplishing other processes in conjunction with other components. For some parts which have been described in the above embodiments, detailed description thereof is omitted here for brevity.

At block 602, the intermediate device may receive a sub latency target for an uplink or downlink latency of one hop of the intermediate device from a first device. The intermediate device may be located in an uplink or downlink route between a second device and a third device. The intermediate device, the first device, the second device and the third device may be the corresponding intermediate device, the first device, the second device and the third device as shown in FIG. 2. For example, the first device may send the one or more sub latency targets to the one or more intermediate devices as shown in block 302 of FIG. 3, then the intermediate device may receive its sub latency target.

At block 604, the intermediate device may perform data processing with resources scheduled according to the sub latency target. For example, the intermediate device may schedule the resources to ensure the data transmission delay not exceeding the sub latency target.

Some embodiments propose a method to manage the uplink/downlink transmission delay along the whole route between a UE and a donor IAB-N to fulfill a given target. According to the latency target, a sub latency target may be assigned to each intermediate node/hop on the link so that the overall summarized latency over the route can meet the given target. For each radio link/hop, the corresponding scheduler performs scheduling to ensure the sub latency target is not exceeded. In some embodiments, the transmission delay management scheme applies for both uplink route and downlink route. In some embodiments, the transmission delay scheme and parameter configuration can be service specific (i.e. per logical channel or per logical channel group). In some embodiments, event triggered and/or polling scheme based transmission delay report can be applied.

In an embodiment, an uplink/downlink total delay target can be determined for data transmission along the uplink route and/or downlink route, and a delay manager (could be modelled as a functionality of route manager, or in the donor IAB-N) can further split the uplink/downlink transmission delay budget between intermediate hops along the route. In such a way, the overall summarized latency target can meet the total latency target. At each hop, the node scheduler schedules the resource to the UE to meet the assigned sub latency target. In this embodiment, each node may provide measurement reports with respect to transmission delay of the hop and other information e.g. configuration of supported numerologies and the slot durations, capability of processing delay for control signaling and data, and traffic load status, configuration of time division duplex pattern etc. The measurement report may be provided to its neighboring nodes. The measurement reports may be further aggregated across all intermediate nodes, and eventually sent to the delay initial node which has initiated transmission. Then the delay manager divides the uplink/downlink total delay budget per hop with these factors taken into account. The delay manger can be located in the donor IAB-N or OAM system.

In an embodiment, the total delay budget of a whole uplink/downlink route and/or the uplink/downlink transmission delay budget per hop can be configured regardless of what service/logical channel/logical channel group is carried on the route. Once the uplink/downlink transmission delay budget for a service/logical channel/logical channel group is configured to a hop, the uplink/downlink scheduler shall ensure that data transmission delay not exceeding this uplink/downlink transmission delay budget.

In an embodiment, the measurement reports on the latency of the hop can be triggered upon occurrence of any below event:
Achieved or achievable transmission delay is below the delay budget by more than a first preconfigured offset, meaning that the allocated transmission delay target is overset, and can be adjusted;
Achieved or achievable transmission delay is above the delay budget by more than a second preconfigured offset, i.e. the allocated delay budget cannot be fulfilled.

The measurement report can use MAC CE or RRC signaling.

In an embodiment, the measurement report of a hop can be reported periodically. The periodicity can be set or reconfigured via RRC signaling.

In an embodiment, the uplink or downlink transmission delay can be reported per one of service, logical channel, logical channel group or radio bearer. The triggering condition in the above embodiment can be also configured per one of service, logical channel, logical channel group or radio bearer.

In an embodiment, the delay manager can poll specific IAB-Ns for measurement reports on requested information. Upon the reception of a polling message, an IAB-N shall generate and transmit the (achieved/achievable) measurement report when there is UL grant available. Upon the reception of (achieved/achievable) uplink/downlink transmission delay report of a hop from at least one IAB-N, the delay manager can reconfigure the uplink/downlink transmission delay budget for the relevant nodes. In case a node is set with a newer latency target, other nodes on the route can be also adjusted accordingly. The reconfiguration of the latency target can be signaled via RRC or a MAC CE.

In an embodiment, the route manager can allocate the uplink/downlink transmission delay budget of the access link for a UE which uses this route.

FIG. 7 is a flow chart depicting a method 700 according to an embodiment of the present disclosure, which may be implemented at an intermediate device such as the intermediate device 208 as shown in FIG. 2 or IAB node as shown in FIG. 1. As such, the intermediate device may provide means for accomplishing various parts of the method 700 as well as means for accomplishing other processes in conjunction with other components. Blocks 704 and 706 are similar to blocks 602 and 604, detailed description thereof is omitted here for brevity.

At block 702, the intermediate device may send a report related to the uplink or downlink latency of the intermediate device to the first device. For example, the report may be provided to its neighboring nodes. The reports may be further aggregated across all intermediate nodes, and eventually sent to the first device.

In an embodiment, the report may comprise at least one of latency measurement report, configuration information, capability information and status information of the intermediate device.

In an embodiment, the latency measurement report may comprise at least one of an uplink transmission latency, a downlink transmission latency and a processing latency.

In an embodiment, the configuration information may comprise at least one of a configuration of supported one or more numerologies, a slot duration and a configuration of time division duplex pattern.

In an embodiment, the capability information may comprise at least one of supportable numerology list, a slot or mini-slot duration list, signaling processing delay for Physical Downlink Shared Channel (PDSCH), signaling processing delay for Physical Uplink Shared Channel (PUSCH) and a list of supportable time division duplex patterns.

In an embodiment, the status information may comprise traffic load status.

In an embodiment, the report may be sent in a media access control control element (MAC CE) or radio resource control (RRC) signaling.

In an embodiment, the report may be sent periodically or in response to receiving a polling message or when the intermediate device determines that an achieved/achievable uplink or downlink latency of the intermediate device is below a corresponding sub latency target by more than a first offset or is above the corresponding sub latency target by more than a second offset.

In an embodiment, a periodicity may be set or reconfigured via a radio resource control (RRC) signaling.

In an embodiment, the sub latency target may be received in a media access control control element (MAC CE) or radio resource control (RRC) signaling.

In an embodiment, the sub latency target and the uplink or downlink latency may be related to a type of service or a logical channel or a logical channel group or a radio bearer.

In an embodiment, the first device may be an independent device or included in the second device or the third device or an operations administration and maintenance (OAM) system.

In an embodiment, the second device, the third device and the intermediate device may be wireless devices.

In an embodiment, the second device may be a donor integrated access backhaul (IAB) node, the third device may be a user equipment, and the intermediate devices may be an IAB node.

Figure 8:
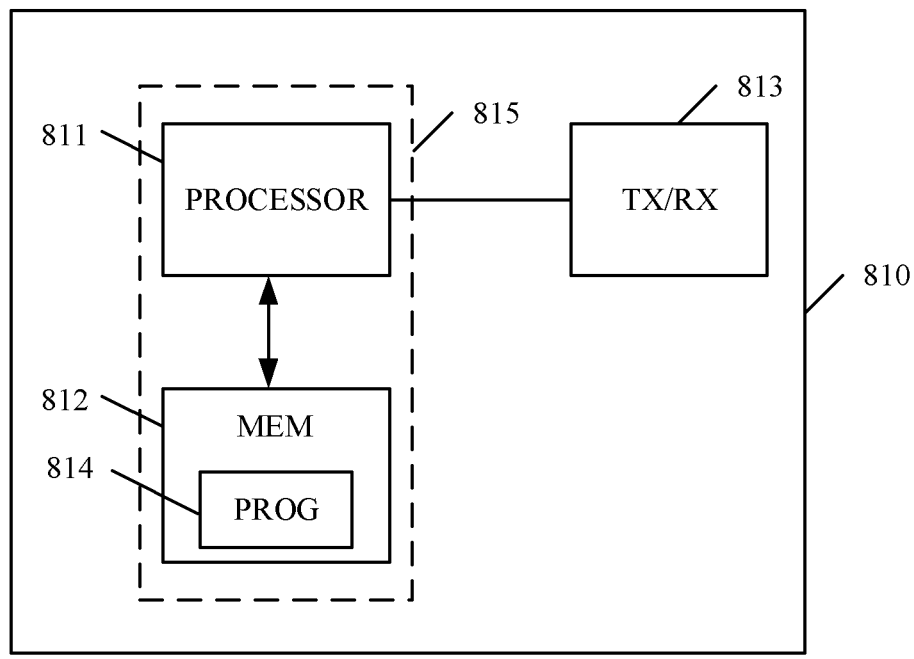
FIG. 8 illustrates a simplified block diagram of an apparatus according to an embodiment of the present disclosure.

FIG. 8 illustrates a simplified block diagram of an apparatus 810 that may be embodied in/as a first device according to an embodiment of the present disclosure.

The apparatus 810 may comprise at least one processor 811, such as a data processor (DP) and at least one memory (MEM) 812 coupled to the processor 811. The apparatus 810 may further comprise a transmitter TX and receiver RX 813 coupled to the processor 811. The MEM 812 stores a program (PROG) 814. The PROG 814 may include instructions that, when executed on the associated processor 811, enable the apparatus 810 to operate in accordance with the embodiments of the present disclosure, for example to perform any of the methods 300, 400 and 500. A combination of the at least one processor 811 and the at least one MEM 812 may form processing means 815 adapted to implement various embodiments of the present disclosure.

Figure 9:
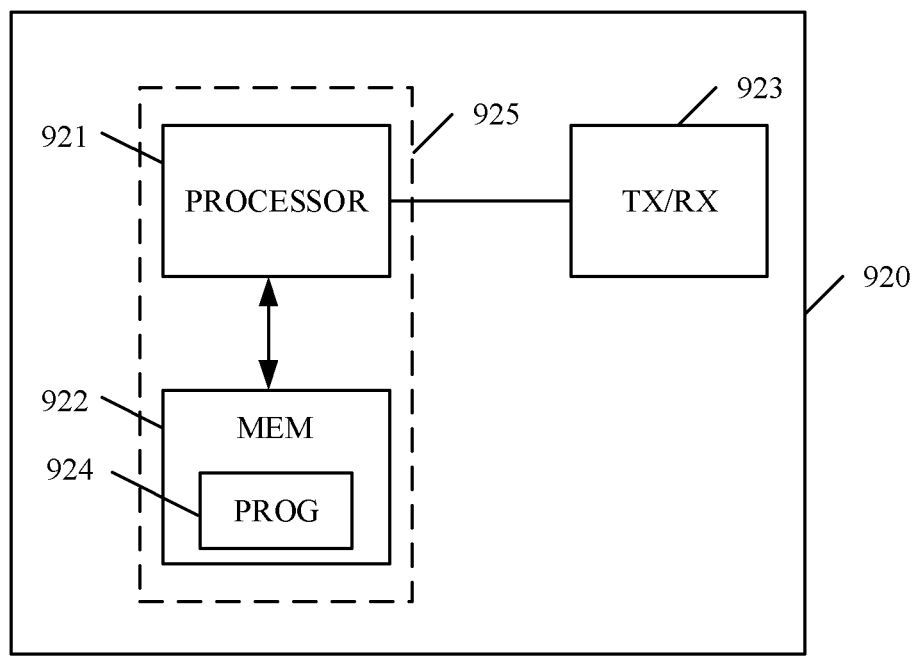
FIG. 9 illustrates a simplified block diagram of an apparatus according to another embodiment of the present disclosure.

FIG. 9 illustrates a simplified block diagram of an apparatus 920 that may be embodied in/as a intermediate device according to an embodiment of the present disclosure.

The apparatus 920 may comprise at least one processor 921, such as a data processor (DP) and at least one memory (MEM) 922 coupled to the processor 921. The apparatus 920 may further comprise a transmitter TX and receiver RX 923 coupled to the processor 921. The MEM 922 stores a program (PROG) 924. The PROG 924 may include instructions that, when executed on the associated processor 921, enable the apparatus 920 to operate in accordance with the embodiments of the present disclosure, for example to perform any of the methods 600 and 700. A combination of the at least one processor 921 and the at least one MEM 922 may form processing means 925 adapted to implement various embodiments of the present disclosure.

Various embodiments of the present disclosure may be implemented by computer program executable by one or more of the processors 811, 921, software, firmware, hardware or in a combination thereof.

The MEMs 812 and 922 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 811 and 921 may be of any type suitable to the local technical environment, and may include one or more of general purpose computers, special purpose computers, microprocessors, digital signal processors DSPs and processors based on multicore processor architecture, as non-limiting examples.

Figure 10:
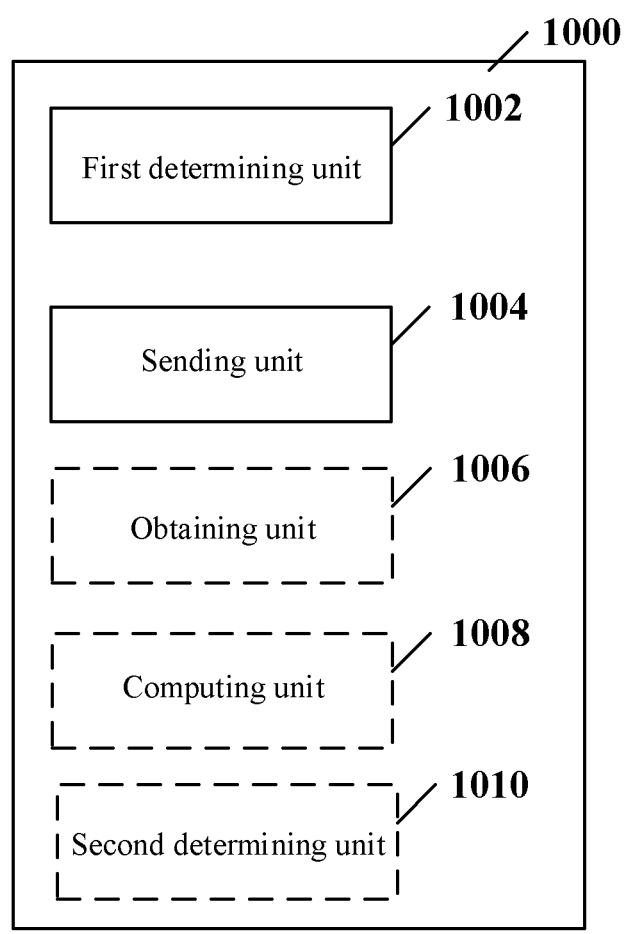
FIG. 10 illustrates a simplified block diagram of an apparatus according to another embodiment of the present disclosure.

Reference is now made to FIG. 10, which illustrates a schematic block diagram of an apparatus 1000 implemented as/at a first device. The apparatus 1000 is operable to carry out any of the exemplary methods 300, 400 and 500 described with reference to FIGS. 3-5 and possibly any other processes or methods.

As shown in FIG. 10, the apparatus 1000 may comprise a first determining unit 1002 configured to determine one or more sub latency targets corresponding to one or more intermediate devices along an uplink or downlink route between a second device and a third device based on an uplink or downlink route total latency target and an uplink or downlink latency of one hop along the uplink or downlink route of each of the one or more intermediate devices; and a sending unit 1004 configured to send the one or more sub latency targets to the one or more intermediate devices. A sum of the one or more sub latency targets is smaller than or equal to the uplink or downlink total latency target.

In an embodiment, the apparatus 1000 may further comprise an obtaining unit 1006 configured to obtain a report related to the uplink or downlink latency; and a computing unit 1008 configured to compute the uplink or downlink latency based on the report.

In an embodiment, the report may comprise at least one of latency measurement report, configuration information, capability information and status information of each of the one or more intermediate devices.

In an embodiment, the latency measurement report may comprise at least one of an uplink transmission latency, a downlink transmission latency and a processing latency.

In an embodiment, the configuration information may comprise at least one of a configuration of supported one or more numerologies, a slot duration and a configuration of time division duplex pattern.

In an embodiment, the capability information may comprise at least one of supportable numerology list, a slot or mini-slot duration list, signaling processing delay for Physical Downlink Shared Channel (PDSCH), signaling processing delay for Physical Uplink Shared Channel (PUSCH) and a list of supportable time division duplex patterns.

In an embodiment, the status information may comprise traffic load status.

In an embodiment, the report may be obtained in a media access control control element (MAC CE) or radio resource control (RRC) signaling or from an operations administration and maintenance (OAM) system.

In an embodiment, the report may be obtained periodically and/or in response to sending a polling message and/or when at least one of the one or more intermediate device determines that an achieved/achievable uplink or downlink latency of the at least one intermediate device is below a corresponding sub latency target by more than a first offset or is above the corresponding sub latency target by more than a second offset.

In an embodiment, a periodicity is set or reconfigured via a radio resource control (RRC) signaling.

In an embodiment, the one or more sub latency targets are sent in a media access control control element (MAC CE) or radio resource control (RRC) signaling.

In an embodiment, the uplink or downlink total latency target, the one or more sub latency targets and the uplink or downlink latency are related to a type of service or a logical channel or a logical channel group or a radio bearer.

In an embodiment, when the uplink or downlink total latency target and/or the uplink or downlink latency of at least one of the one or more intermediate device have changed, steps of determining and sending are re-performed.

In an embodiment, the first device is an independent device or included in the second device or the third device or an operations administration and maintenance (OAM) system.

In an embodiment, the second device, the third device and the one or more intermediate devices are wireless devices.

In an embodiment, the second device is a donor integrated access backhaul (IAB) node, the third device is a user equipment, and the one or more intermediate devices are IAB nodes.

In an embodiment, the apparatus may further comprise: a second determining unit 1010 configured to determine the uplink or downlink total latency target according to Quality of Service (QoS) requirement.

Figure 11:
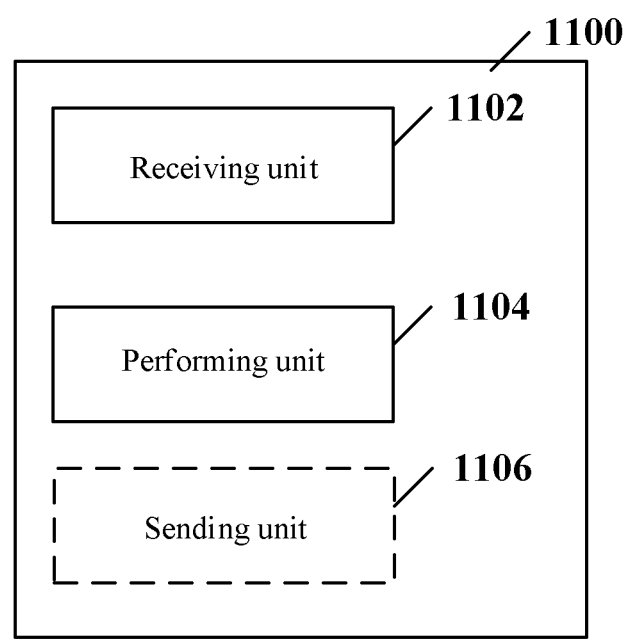
FIG. 11 illustrates a simplified block diagram of an apparatus according to another embodiment of the present disclosure.

Reference is now made to FIG. 11, which illustrates a schematic block diagram of an apparatus 1100 implemented as/at an intermediate device. The apparatus 1100 is operable to carry out any of the exemplary methods 600 and 700 described with reference to FIGS. 6-7 and possibly any other processes or methods.

As shown in FIG. 11, the apparatus 1100 may comprise a receiving unit 1102 configured to receive a sub latency target for an uplink or downlink latency of one hop of the intermediate device from a first device; and a performing unit 1104 configured to perform data processing with resources scheduled according to the sub latency target, wherein the intermediate device is located in an uplink or downlink route between a second device and a third device.

In an embodiment, the apparatus may further comprise a sending unit 1106 configured to send a report related to the uplink or downlink latency of the intermediate device to the first device.

In an embodiment, the report comprises at least one of latency measurement report, configuration information, capability information and status information of the intermediate device.

In an embodiment, the latency measurement report comprises at least one of an uplink transmission latency, a downlink transmission latency and a processing latency.

In an embodiment, the configuration information comprises at least one of a configuration of supported one or more numerologies, a slot duration and a configuration of time division duplex pattern.

In an embodiment, the capability information comprises at least one of supportable numerology list, a slot or mini-slot duration list, signaling processing delay for Physical Downlink Shared Channel (PDSCH), signaling processing delay for Physical Uplink Shared Channel (PUSCH) and a list of supportable time division duplex patterns.

In an embodiment, the status information comprises traffic load status.

In an embodiment, the report is sent in a media access control control element (MAC CE) or radio resource control (RRC) signaling.

In an embodiment, the report is sent periodically or in response to receiving a polling message or when the intermediate device determines that an achieved/achievable uplink or downlink latency of the intermediate device is below a corresponding sub latency target by more than a first offset or is above the corresponding sub latency target by more than a second offset.

In an embodiment, a periodicity is set or reconfigured via a radio resource control (RRC) signaling.

In an embodiment, the sub latency target is received in a media access control control element (MAC CE) or radio resource control (RRC) signaling.

In an embodiment, the sub latency target and the uplink or downlink latency are related to a type of service or a logical channel or a logical channel group or a radio bearer.

In an embodiment, the first device is an independent device or included in the second device or the third device or an operations administration and maintenance (OAM) system.

In an embodiment, the second device, the third device and the intermediate device are wireless devices.

In an embodiment, the second device is a donor integrated access backhaul (IAB) node, the third device is a user equipment, and the intermediate devices is an IAB node.

According to an aspect of the disclosure it is provided a computer program product being tangibly stored on a computer readable storage medium and including instructions which, when executed on at least one processor, cause the at least one processor to carry out any of the methods related to the first device as described above.

According to an aspect of the disclosure it is provided a computer-readable storage medium storing instructions which when executed by at least one processor, cause the at least one processor to carry out any of the methods related to the intermediate device as described above.

According to an aspect of the disclosure it is provided a computer program product being tangibly stored on a computer readable storage medium and including instructions which, when executed on at least one processor, cause the at least one processor to carry out any of the methods related to the first device as described above.

According to an aspect of the disclosure it is provided a computer-readable storage medium storing instructions which when executed by at least one processor, cause the at least one processor to carry out carry out any of the methods related to the intermediate device as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Some embodiments of the disclosure can improve the delay performance of self-backhauling. Some embodiments herein may improve the delay requirement of service.

Figure 12:
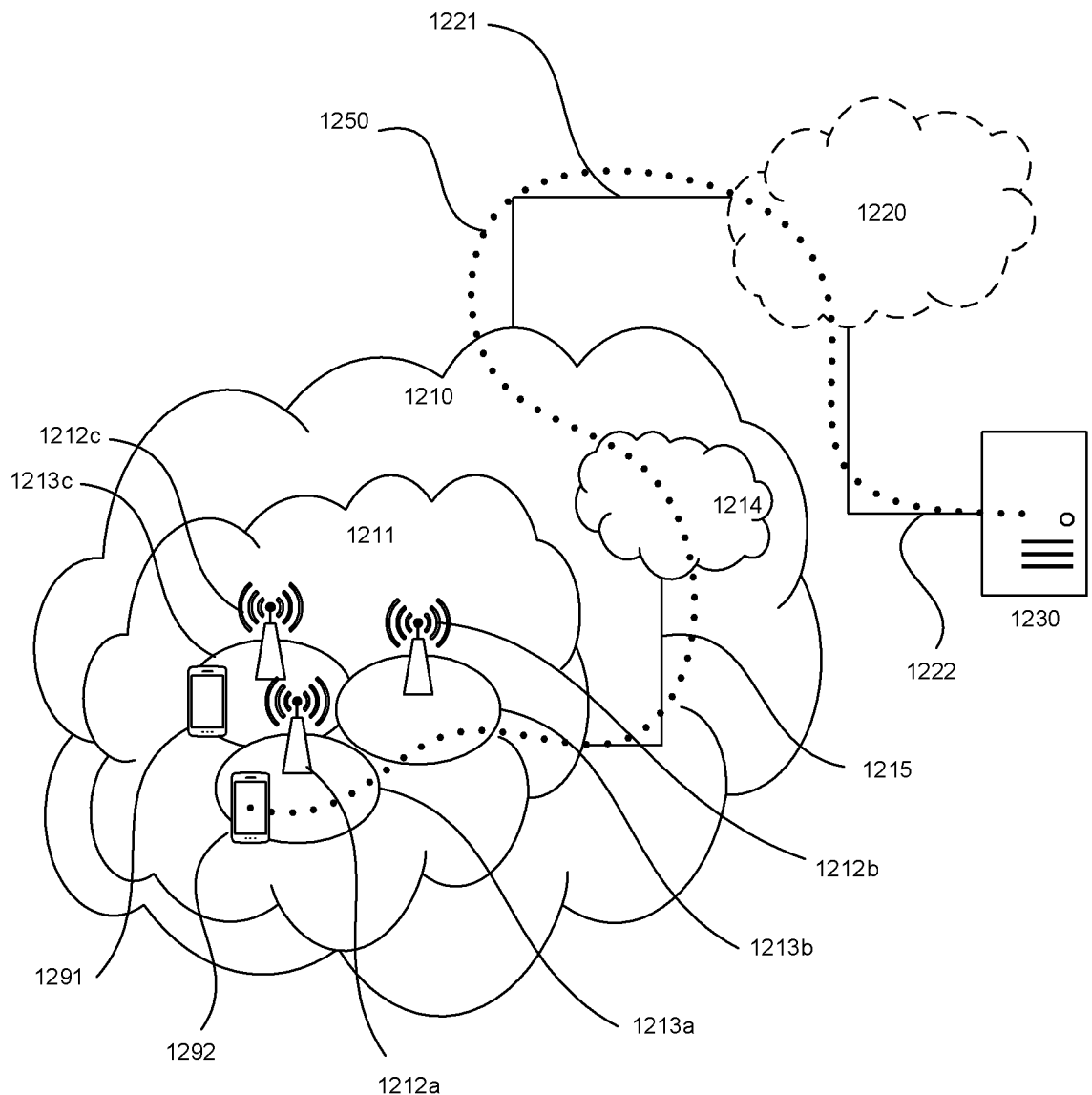
FIG. 12 is a block diagram illustrating a telecommunication network connected via an intermediate network to a host computer in accordance with some embodiments of the present disclosure.

FIG. 12 is a block diagram illustrating a telecommunication network connected via an intermediate network to a host computer in accordance with some embodiments of the present disclosure.

With reference to FIG. 12, in accordance with an embodiment, a communication system includes a telecommunication network 1210, such as a 3GPP-type cellular network, which comprises an access network 1211, such as a radio access network, and a core network 1214. The access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first UE 1291 located in a coverage area 1213c is configured to wirelessly connect to, or be paged by, the corresponding base station 1212c. A second UE 1292 in a coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. Connections 1221 and 1222 between the telecommunication network 1210 and the host computer 1230 may extend directly from the core network 1214 to the host computer 1230 or may go via an optional intermediate network 1220. An intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, the base station 1212 may not or need not be informed about the past routing of an incoming downlink communication with data originating from the host computer 1230 to be forwarded (e.g., handed over) to a connected UE 1291. Similarly, the base station 1212 need not be aware of the future routing of an outgoing uplink communication originating from the UE 1291 towards the host computer 1230.

Figure 13:
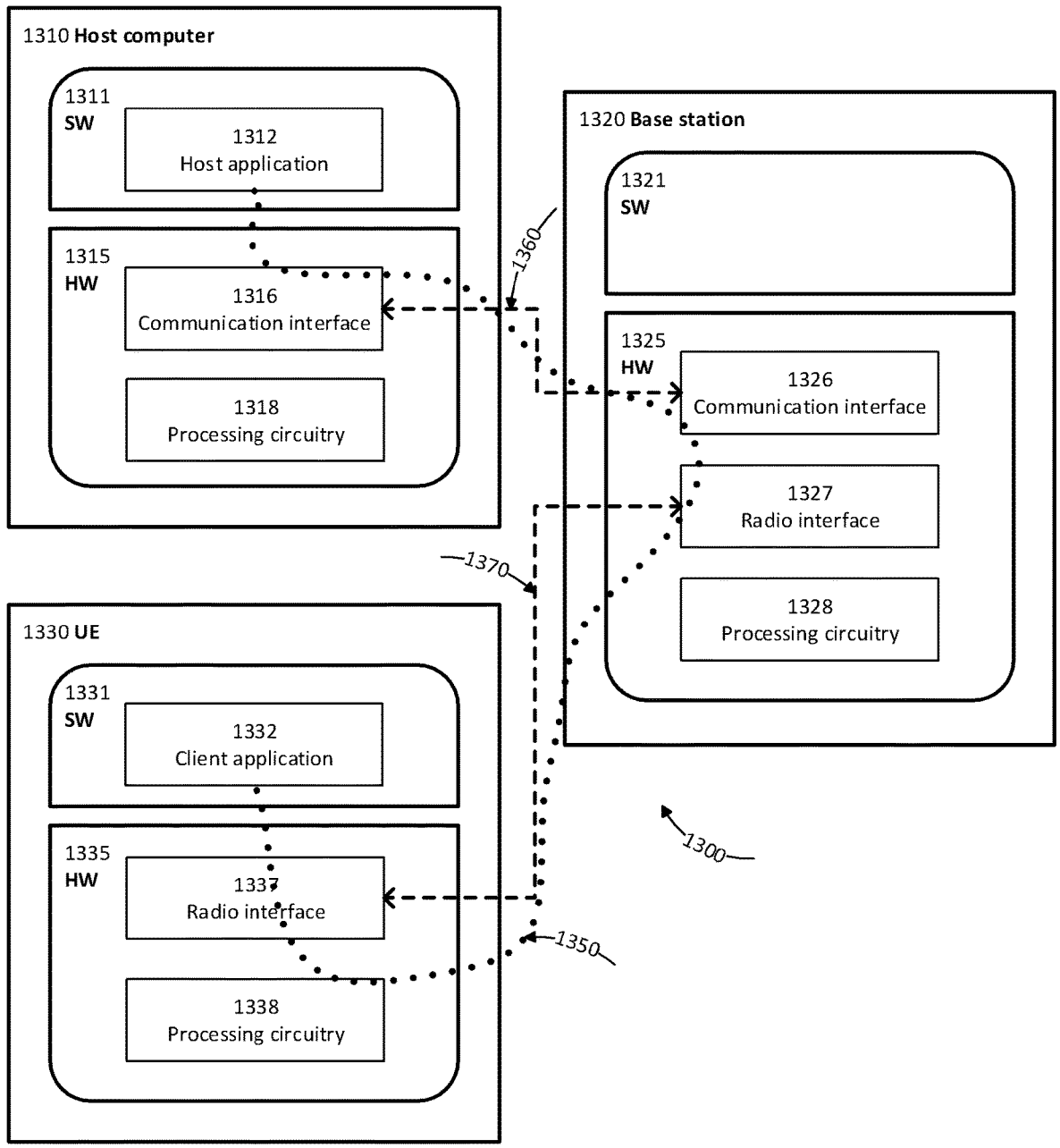
FIG. 13 is a block diagram illustrating a host computer communicating via a base station with a UE over a partially wireless connection in accordance with some embodiments of the present disclosure.

FIG. 13 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises a processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with the UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes a processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes a processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

It is noted that the host computer 1310, the base station 1320 and the UE 1330 illustrated in FIG. 13 may be similar or identical to the host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the UE 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

Wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1350 between the host computer 1310 and the UE 1330, in response to variations in the measurement results. The measurement procedure and/or the network functionality for reconfiguring the OTT connection 1350 may be implemented in software 1311 and hardware 1315 of the host computer 1310 or in software 1331 and hardware 1335 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which the software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer 1310's measurements of throughput, propagation times, latency and the like. The measurements may be implemented in that the software 1311 and 1331 causes messages to be transmitted, in particular empty or 'dummy' messages, using the OTT connection 1350 while it monitors propagation times, errors etc.

Figure 14:
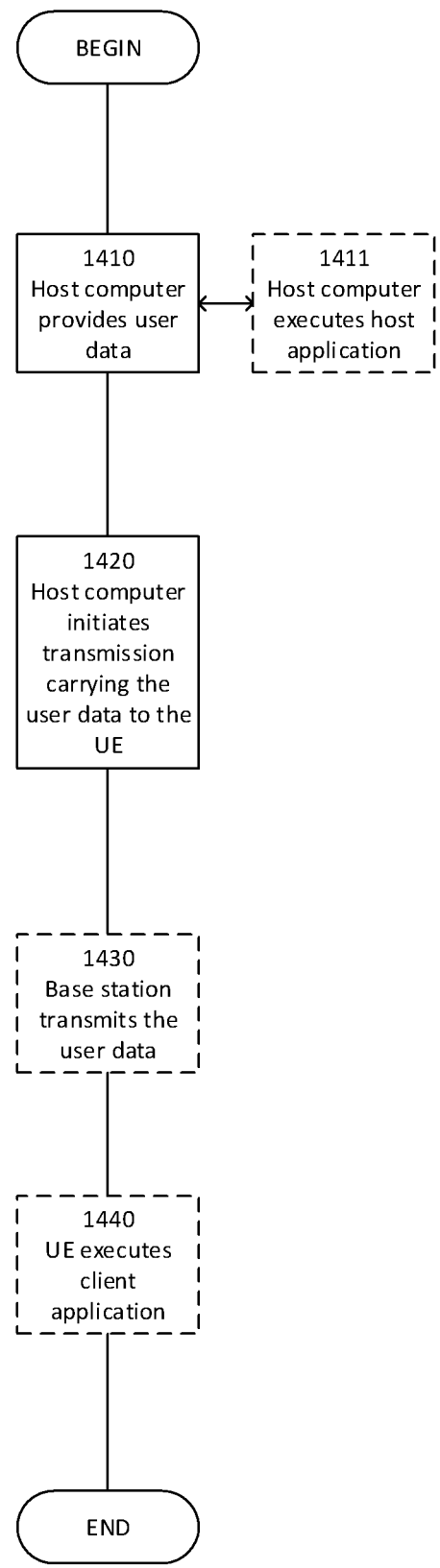
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
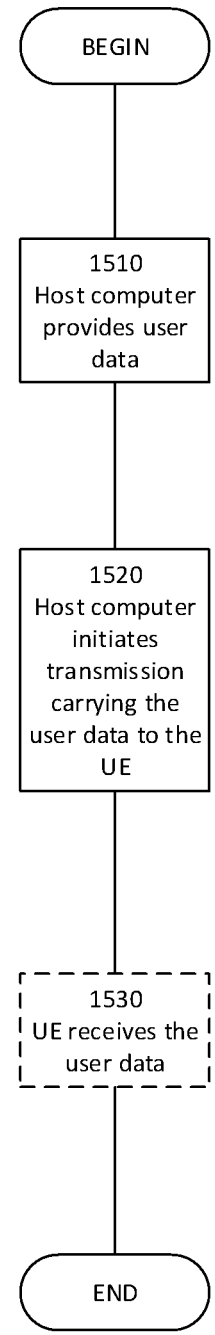
FIG. 15 is a flowchart illustrating a method implemented in a communication system, in accordance with an embodiment of the present disclosure.

FIG. 15 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
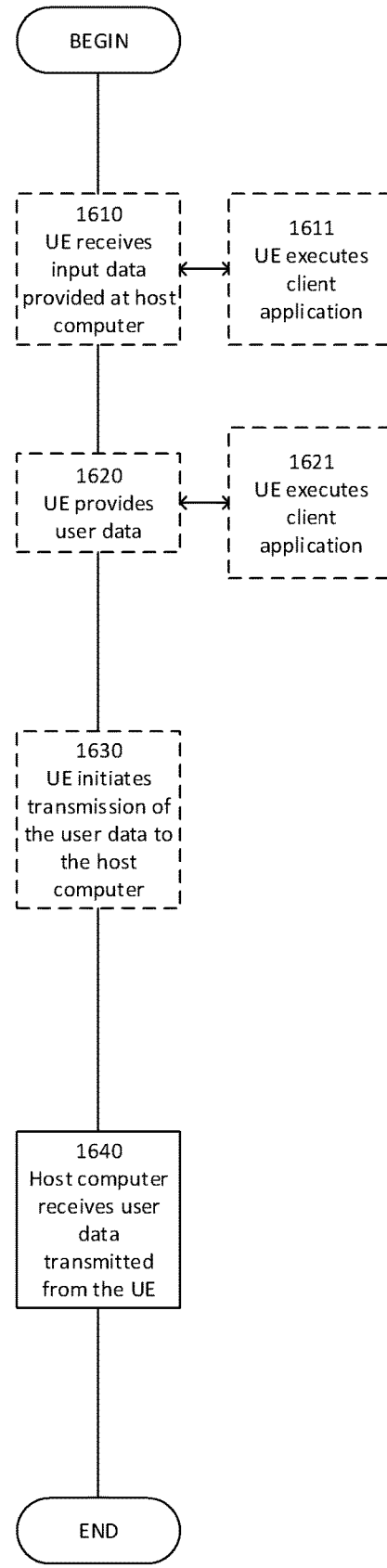
FIG. 16 is a flowchart illustrating a method implemented in a communication system, in accordance with an embodiment of the present disclosure.

FIG. 16 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
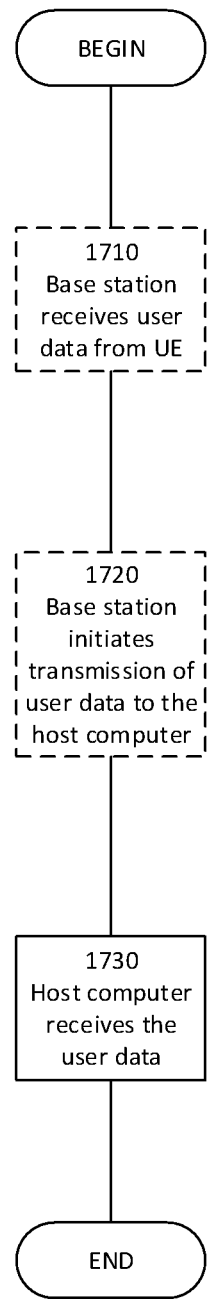
FIG. 17 is a flowchart illustrating a method implemented in a communication system, in accordance with an embodiment of the present disclosure.

FIG. 17 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a first device, comprising:
determining one or more sub latency targets corresponding to one or more intermediate devices along an uplink or downlink route between a second device and a third device based on an uplink or downlink route total latency target and an uplink or downlink latency of one hop along the uplink or downlink route of each of the one or more intermediate devices;
sending the one or more sub latency targets to the one or more intermediate devices,
wherein a sum of the one or more sub latency targets is less than or equal to the uplink or downlink route total latency target; and
obtaining a report comprising configuration information comprising at least one of: a configuration of supported one or more numerologies, a slot duration, or a configuration of a time division duplex pattern.

2. The method according to claim 1, wherein:
the report is related to the uplink or downlink latency; and
the method further comprises computing the uplink or downlink latency based on the report.

3. The method according to claim 2, wherein the report comprises, in addition to the configuration information, at least one of latency measurement report, capability information and status information of each of the one or more intermediate devices.

4. The method according to claim 3, wherein the report comprises the latency measurement report, the latency measurement report comprising at least one of an uplink transmission latency, a downlink transmission latency and a processing latency; and/or
the report comprises the capability information, the capability information comprising at least one of supportable numerology list, a slot or mini-slot duration list, signaling processing delay for Physical Downlink Shared Channel (PDSCH), signaling processing delay for Physical Uplink Shared Channel (PUSCH) and a list of supportable time division duplex patterns; and/or
the report comprises the status information, the status information comprising traffic load status.

5. The method according to claim 3, wherein the report comprises the latency measurement report, and the latency measurement report is triggered upon occurrence of a triggering condition of:
an achieved or achievable transmission delay is below a delay budget by more than a first preconfigured offset; or
the achieved or achievable transmission delay is above the delay budget by more than a second preconfigured offset.

6. The method according to claim 5, wherein the triggering condition is configured per one of: service, logical channel, logical channel group or radio bearer.

7. The method according to claim 5, wherein an uplink or downlink transmission delay is reported per one of: service, logical channel, logical channel group or radio bearer.

8. The method according to claim 1, wherein the report is obtained in a media access control control element (MAC CE) or radio resource control (RRC) signaling or from an operations administration and maintenance (OAM) system; and/or the report is obtained periodically and/or in response to sending a polling message and/or when at least one of the one or more intermediate device determines that an achieved/achievable uplink or downlink latency of the at least one intermediate device is below a corresponding sub latency target by more than a first offset or is above the corresponding sub latency target by more than a second offset.

9. The method according to claim 1, wherein a periodicity is set or reconfigured via a radio resource control (RRC) signaling.

10. The method according to claim 1, wherein the one or more sub latency targets are sent in a media access control control element (MAC CE) or radio resource control (RRC) signaling.

11. The method according to claim 1, wherein the uplink or downlink total latency target, the one or more sub latency targets and the uplink or downlink latency are related to a type of service or a logical channel or a logical channel group or a radio bearer.

12. The method according to claim 1, wherein when the uplink or downlink route total latency target and/or the uplink or downlink latency of at least one of the one or more intermediate device have changed, steps of determining and sending are re-performed.

13. The method according to claim 1, wherein the first device is an independent device or included in the second device or the third device or an operations administration and maintenance (OAM) system.

14. The method according to claim 1, wherein the second device, the third device and the one or more intermediate devices are wireless devices.

15. The method according to claim 1, wherein the second device is a donor integrated access backhaul (IAB) node, the third device is a user equipment, and the one or more intermediate devices are IAB nodes.

16. The method according to claim 1, further comprising:
determining the uplink or downlink total route latency target according to Quality of Service (QoS) requirement.

17. A method implemented at an intermediate device, comprising:
receiving a sub latency target for an uplink or downlink latency of one hop of the intermediate device from a first device;
performing data processing with resources scheduled according to the sub latency target; and
sending a report related to the uplink or downlink latency of the intermediate device, wherein the report comprises configuration information comprising at least one of: a configuration of supported one or more numerologies, a slot duration, or a configuration of a time division duplex pattern to the first device, wherein the intermediate device is located in an uplink or downlink route between a second device and a third device.

18. An apparatus implemented at a first device, comprising:
a processor; and
a memory coupled to the processor, said memory containing instructions executable by said processor, whereby said processor is operative to:
determine one or more sub latency targets corresponding to one or more intermediate devices along an uplink or downlink route between a second device and a third device based on an uplink or downlink route total latency target and an uplink or downlink latency of one hop along the uplink or downlink route of each of the one or more intermediate devices;
send the one or more sub latency targets to the one or more intermediate devices, wherein a sum of the one or more sub latency targets is less than or equal to the uplink or downlink route total latency target; and
obtain a report comprising configuration information comprising at least one of: a configuration of supported one or more numerologies, a slot duration, or a configuration of a time division duplex pattern.

19. The apparatus according to claim 18 wherein the processor is further configured to:
obtain a report related to the uplink or downlink latency; and
compute the uplink or downlink latency based on the report.

* * * * *